(12) United States Patent
Malášek

(10) Patent No.: US 7,781,920 B2
(45) Date of Patent: Aug. 24, 2010

(54) PUSH-ON/PUSH-OFF POWER-SWITCHING CIRCUIT

(76) Inventor: Jan Yuki Malášek, 6000 S. Eastern Ave. Suite 12-D, Las Vegas, NV (US) 89119

( * ) Notice: Subject to any disclaimer, the term of this patent is extended or adjusted under 35 U.S.C. 154(b) by 415 days.

(21) Appl. No.: 12/050,957

(22) Filed: Mar. 19, 2008

(65) Prior Publication Data
US 2009/0237065 A1    Sep. 24, 2009

(51) Int. Cl.
*H01H 3/34* (2006.01)
(52) U.S. Cl. ................... 307/141.4; 323/349; 361/93.2
(58) Field of Classification Search ......... 323/284–288, 323/299, 349, 318, 904; 307/141, 141.4, 307/126, 249, 64, 66, 125; 361/93.1, 93.2, 361/59, 101
See application file for complete search history.

(56) References Cited
U.S. PATENT DOCUMENTS

| | | | |
|---|---|---|---|
| 3,255,365 A | 6/1966 | Henle | |
| 3,601,680 A * | 8/1971 | Beckwith | 363/26 |
| 3,831,081 A | 8/1974 | Weiss | |
| 4,264,785 A * | 4/1981 | Jacobson | 379/78 |
| 4,344,071 A * | 8/1982 | Allen | 340/566 |
| 4,538,074 A | 8/1985 | Fraden | |
| 4,862,012 A * | 8/1989 | Mardon | 307/38 |
| 5,692,203 A | 11/1997 | Grodevant | |
| 5,714,809 A * | 2/1998 | Clemo | 307/125 |
| 6,548,996 B2 | 4/2003 | Yi | |
| 7,196,431 B2 * | 3/2007 | Eckert et al. | 307/9.1 |

* cited by examiner

*Primary Examiner*—Rajnikant B Patel

(57) ABSTRACT

An electrical power-switching circuit controls power to an electronic device. In some embodiments, the circuit consists of only transistors, resistors, and capacitors, making it small, low cost, and functional over a wide range of supply voltages. The circuit may be switched on and off by a momentary-contact switch. The circuit can be constructed so that, except for transistor leakage current, no power is consumed in the off state, and the controlled device can shut off its own power.

13 Claims, 1 Drawing Sheet

PUSH-ON/PUSH-OFF POWER-SWITCHING CIRCUIT

FEDERALLY SPONSORED RESEARCH

Not Applicable

SEQUENCE LISTING OR PROGRAM

Not Applicable

BACKGROUND

1. Field of Invention

This invention relates to the field of electronic circuits, specifically to a power-switching circuit allowing a momentary-contact switch to control the power to an electronic device.

2. Background of the Invention

Electronic devices are traditionally turned on and off by mechanical switches that latch permanently in the on or the off state.

The miniaturization of electronics has driven designs away from mechanical switches. Portable devices such as cell phones and calculators have recently become cheaper, smaller, and more complex. In such devices, the mechanical components of a switch are prohibitively large and expensive, and an electrical switching circuit must be used instead. This is particularly true for devices with current requirements in the 1-50 ampere range, where mechanical switches might be more than ten times larger and more than ten times more expensive than their electrical counterparts. Mechanical switches form part of the user interface, so they must have visual and tactile appeal, which puts even more constraints on their design. An electrical switch can be internal and invisible to the customer, allowing more flexibility in its design.

When an electrical switch is used to control power to a device, a small mechanical switch can be used to control the electrical switch. Since the mechanical switch does not conduct the main device power, it can be small and inexpensive.

Another advantage of using an electrical switch is that the device can turn off its own power. Since the state of the switch is stored electrically, it is possible for the main circuit of the device to have an output that shuts off power. This provides an "auto-off" or "sleep" function for the device.

U.S. Pat. No. 4,538,074 (Fraden, 1985) describes a switching circuit requiring a microprocessor, two transistors, and a bilateral switch. The switching circuits in U.S. Pat. No. 3,831, 081 (Weiss, 1974), U.S. Pat. No. 5,692,203 (Grodevant, 1997), and U.S. Pat. No. 6,548,996, (Yi, 2003) each employ multiple logic gates or a flip-flop. Such components add significant cost to devices using these designs, and they consume power even in the "off" state. More importantly, these components put limitations on the voltage of the power supply. A typical flip-flop requires a voltage supply of 4.75 to 5.25 volts, while battery-powered devices are built to use voltage supplies anywhere from 1 to 20 volts, and a single battery pack might, for example, vary between 4.0 and 6.5 volts during its useful life.

U.S. Pat. No. 3,255,365 (Henle, 1966) describes a simple bistable circuit using a PNP and an NPN transistor that requires separate switches for its on and off switching functions. The bistable circuit used as part of the present invention is an improved version of the bistable circuit described in that patent.

BRIEF SUMMARY OF THE INVENTION

One embodiment of the present invention is a low-cost switching circuit, requiring only transistors, resistors, and capacitors, that operates over an input voltage range of 1 to 7 volts and, except for transistor leakage current, consumes no power when off.

DRAWINGS—LABELED PARTS

The values of the components specified below are example values corresponding to Claim 9. The values must be adjusted for the circuit to operate under different conditions.

C1 capacitor, 4.7 uF
C2 optional capacitor, 0.1 uF
R1 resistor, 10 kohm
R2 resistor, 10 kohm
R3 resistor, 100 kohm
R4 resistor, 10 kohm
R5 resistor, 4.7 kohm
R6 resistor, 100 kohm
S optional shut-off input
SW1 momentary-contact power switch
SW2 optional additional power switch
Vin input or battery voltage
Vout output voltage
Q1 P-channel metal-oxide semiconductor field-effect transistor (PFET)
Q2 NPN transistor
Q3 PNP transistor
Q4 optional NPN shut-off transistor

DETAILED DESCRIPTION OF THE INVENTION-FIRST EMBODIMENT

Figure 1:
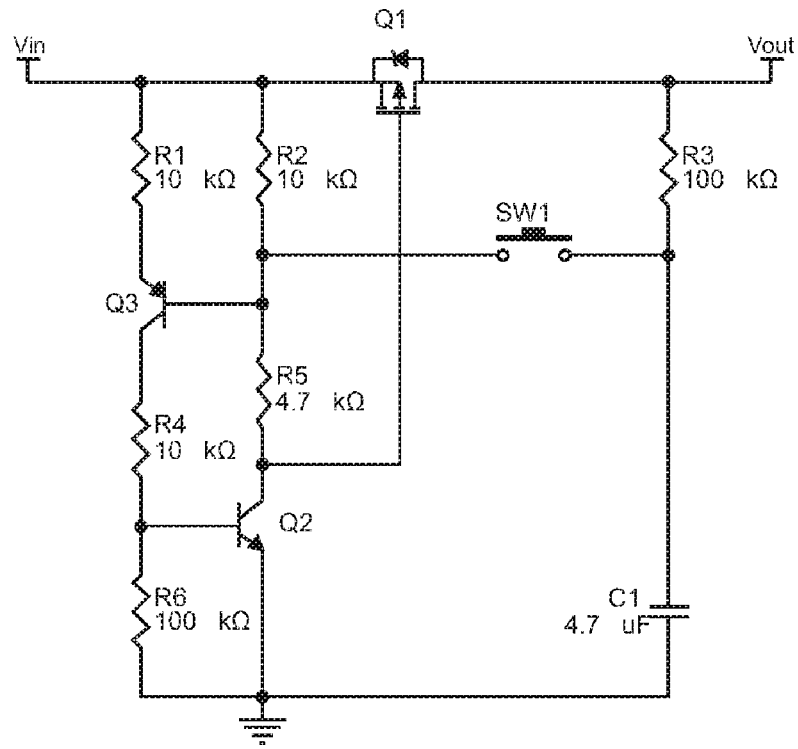
FIG. 1 shows an example of the first embodiment of the invention, which is the most basic configuration of the circuit.

FIG. 1 shows a circuit diagram of the most basic embodiment of the switching circuit.

The circuit uses a P-channel metal-oxide semiconductor field-effect transistor (PFET) Q1 to separate an input or battery voltage Vin from an output voltage Vout, with the source of Q1 connected to Vin and the drain of Q1 connected to Vout. Both sides of the circuit share a common ground.

Together, 10 kohm resistors R1, R2, and R4, a 4.7 kohm resistor R5, a 100 kohm resistor R6, NPN transistor Q2, and PNP transistor Q3 form a bistable circuit as follows: The emitter and base of Q3 are connected through R1 and R2, respectively, to Vin. The base of Q3 is connected through R5 to the collector of Q2, and the collector of Q3 is connected through R4 to the base of Q2. The emitter of Q2 is connected directly to ground, and the base of Q2 is connected through R6 to ground.

The gate of Q1 is connected to the collector of Q2.

A 100 kohm resistor R3 and a 4.7 microfarad capacitor C1 form an RC delay circuit on the output, with Vout connected through R3, then C1, to ground. The positive terminal of C1 is connected through a switch SW1 to the base of Q3.

Operation of Invention

The goal of this circuit is to electrically control the power to an electronic device, offering the ability to turn it on and off with a momentary-contact switch. The power is controlled by Q1, which only allows current to flow from Vin to Vout when its gate is held low (close to 0 volts). This gate voltage is controlled by the bistable circuit, which produces either a low or a high output, depending on its state.

The bistable circuit works as follows:

1) On: Q2 and Q3 are both turned on. This effectively creates two voltage dividers, one formed by R2 and R5 and one formed by R1, R4, and R6. The voltage dividers set the voltages at the bases of Q2 and Q3 such that they remain on indefinitely.

2) Off: Q2 and Q3 are both turned off. Since no current flows through either transistor, the voltages at the bases of Q2 and Q3 are 0 volts and Vin, respectively. These base voltages cause Q2 and Q3 to remain off indefinitely.

The RC delay circuit formed by R3 and C1 allows the state of the power-switching circuit to be toggled on or off. The two cases are:

1) When the circuit is on, Vout is connected to Vin. Once C1 is fully charged, the voltage at its positive terminal is equal to Vin. Closing SW1 forces the circuit into the off state. It is important to note that under high-load conditions, Vout will be lower than Vin, which could result in a base voltage on Q3 that is too low to turn it off. R1 lowers the voltage on the emitter of Q3, ensuring that Q3 will be turned completely off even under high-load conditions.

2) When the circuit is off, Vout is disconnected from Vin. Due to internal conductivity or any attached loads, C1 discharges and reaches 0 volts. Closing SW1 forces the circuit into the on state.

In this way, closing SW1 turns the circuit alternately completely on or off.

DETAILED DESCRIPTION—ALTERNATIVE EMBODIMENT

Figure 2:
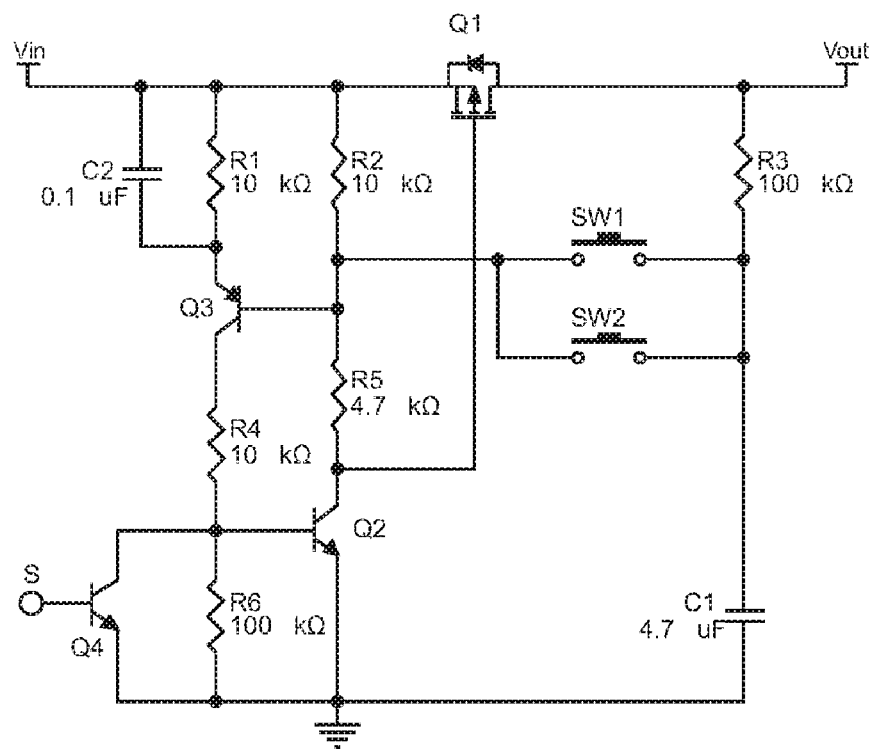
FIG. 2 shows a more general embodiment of the invention, with optional components installed.

FIG. 2 shows an alternative embodiment of the circuit. All components from the first embodiment remain in this version, but three optional parts have been added.

1) Capacitor C2 is added between Vin and the emitter of Q3.

2) An additional momentary-contact switch SW2 is added in parallel with SW1.

3) NPN transistor Q4 is added, with its collector connected to the base of Q2 and its emitter connected to ground.

Operation of Alternative Embodiment

C2 can improve the stability of the switching circuit. It might be required for certain voltage ranges or to reduce susceptibility to fluctuations in Vin. Because of its position in the circuit, no leakage current can flow through C2 when the circuit is switched off.

SW2 provides a second way to turn the circuit on and off. Either switch can independently control the operation of the circuit. Any number of switches can be added as desired. For example, if the circuit were used to control lighting in a room, it might be desirable to have one switch next to each door of the room.

Q4 provides an automatic shut-off option to the controlled device. For example, a microprocessor can send a positive voltage into the base of Q4 (labeled by S) and turn off Q2, causing the entire circuit to shut down.

ADVANTAGES OF INVENTION

The description above demonstrates several advantages of the invention:

1) An electrical switching circuit is used instead of a mechanical switch to control power. This allows a very compact, low-cost design that works for relatively high currents and is compatible with portable electronic devices.

2) The circuit is made of only transistors, resistors, and capacitors, which can have a large operating voltage range. The embodiments presented work with Vin between 1 and 7 volts, which is optimal for a variety of battery-powered circuits. Other embodiments of this invention work over other, similarly wide voltage ranges.

3) Unlike a mechanical switch, the circuit does not bounce: as soon as power turns on or off, it stays in that state.

4) The lifetime of the circuit is much longer than that of a mechanical switch, because it is not subject to the combination of mechanical wear and electrical sparking.

5) All components are turned off when the device is shut off, which means that, except for the transistor leakage current, no power will be consumed, conserving battery life. Transistor leakage current is typically less than one microampere.

6) An optional shut-off feature allows the controlled device to shut off its own power.

7) Multiple switches can be connected in parallel, and any one of them can turn the switching circuit on and off.

CONCLUSION, RAMIFICATIONS, AND SCOPE OF INVENTION

As explained above, the first embodiment of this invention provides a low-cost power-switching circuit for high currents. The invention is particularly suited for portable electronic devices since it uses almost no power in the off state.

The above description contains many specifics, but these should not be seen as limitations on the scope of the invention. Instead, the specifics are given as an example of one embodiment of the invention. Many other variations are possible. For example, the values of resistors R1-R6 are optimized for operation from 1 to 7 volts. Different input voltages will require different values for the resistors. Some other power-switching means could be used in place of the PFET. Likewise, Q2 and Q3 could be replaced by other types of transistors.

Standard precautions should be taken to protect this device from its power supply and circuit: for example, noise-filtering capacitors between Vout and ground might be necessary to prevent unintended shut-off.

The circuit can be created entirely with discrete components on a circuit board, or some of its components can be combined into an integrated circuit (IC). The entire circuit could potentially be included within a much more complicated IC. Packages containing multiple transistors are also useful for a compact embodiment of this invention.

The optional transistor Q4 could also be positioned to control the voltage at the base of Q3 instead of Q2, and a PNP transistor, field-effect transistor, or some other switching means might be substituted for Q4. In some applications, this transistor is included in the driver circuit of an output pin of the controlled device.

Therefore, the scope of the present invention should be determined by the following claims and their legal equivalents, not by the specific embodiments illustrated above.

What is claimed is:

1. An electrical switching circuit comprising:
 a) a power input, which may vary over a large range of voltages,
 b) a power output, c) an RC circuit that provides a configurable delay,
d) a momentary switch, and
e) a bistable circuit comprising a first transistor and a second transistor and five resistors,
f) each transistor having a positive terminal, a negative terminal, and a controlling terminal,
g) said power output being connected to said power input through an electrically controlled switching device, so that said switching device controls current flowing to said output,
h) the positive terminal of said first transistor being connected through the first resistor to the power input,
i) the controlling terminal of said first transistor being connected through the second resistor to the power input,
j) the controlling terminal of said first transistor being connected through the third resistor to the positive terminal of said second transistor,
k) the negative terminal, of said first transistor being connected through the fourth resistor to the controlling terminal of said second transistor, and
l) the controlling terminal of said second transistor being connected through the fifth resistor to ground,
m) the negative terminal of said second transistor being connected directly to ground,
n) said momentary switch connecting said RC circuit to the controlling terminal of said first transistor, and
o) said electrically controlled switching device being connected to the positive terminal of said second transistor, which is the output of the bistable circuit,
whereby said bistable circuit is stable in an on state, with both transistors turned on, and an off state, with both transistors completely off and consuming no power except for a small leakage current, and each time said momentary switch is closed, said power output is alternately connected to said power input and disconnected from said power input through said electrically controlled switching device.

2. The switching circuit of claim 1, wherein said electrically controlled switching device is a P-channel metal-oxide semiconductor field-effect transistor (PFET),
a) the source of said PFET being connected to said power input,
b) the drain of said PFET being connected to said power output, and
c) the gate of said PFET being connected to the positive terminal of said second transistor,
whereby said PFET may conduct a large amount of current without introducing a significant voltage drop or perturbing said bistable circuit.

3. The switching circuit of claim 1, wherein said RC circuit comprises a resistor and capacitor in series, with said power output connected through said resistor, then through said capacitor, to ground, and said momentary switch connecting to the common node of said resistor and capacitor, whereby said resistor and capacitor may be adjusted as necessary for the range of voltages and any desired on- and off- characteristics of the circuit.

4. The switching circuit of claim 1, furthermore including:
a) one or more capacitors,
b) said capacitors being connected between said power output and ground,
whereby said capacitors stabilize said power output, preventing unintended shut-off of said switching circuit.

5. The switching circuit of claim 1, further including:
a) any number of additional momentary switches,
b) said momentary switches being connected in parallel with the first momentary switch,
whereby each momentary switch may independently control said switching circuit.

6. The switching circuit of claim 1, wherein said first transistor is a PNP transistor, its controlling terminal is a base, its positive terminal is an emitter, and its negative terminal is a collector, and said second transistor is an NPN transistor, its controlling terminal is a base, its positive terminal is a collector, and its negative terminal is an emitter.

7. The switching circuit of claim 1, wherein said first transistor is a PFET, its controlling terminal is a gate, its positive terminal is a source, and its negative terminal is a drain, and said second transistor is an N-channel metal-oxide semiconductor field-effect transistor (NFET), its controlling terminal is a gate, its positive terminal is a drain, and its negative terminal is a source.

8. The switching circuit of claim 6, wherein:
a) an additional capacitor is added to stabilize the voltage at the emitter of said PNP transistor against positive fluctuations on said power input,
b) said additional capacitor being connected between the power input and the emitter of said PNP transistor,
whereby power shut-off is made more reliable.

9. The switching circuit of claim 6 wherein specific values for components are chosen,
a) the resistor of the RC circuit having a value of 100 kohm,
b) the capacitor of the RC circuit having a value of 4.7 microfarads,
c) the first, second, and fourth resistors of the bistable circuit each having a value of 10 kohm,
d) the third resistor of the bistable circuit having a value of 4.7 kohm, and
e) the fifth resistor of the bistable circuit having a value of 100 kohm,
whereby the specified component values provide operation when said power input is between 1 and 7 volts.

10. The switching circuit of claim 6 wherein specific values for components are chosen,
f) the resistor of the RC circuit having a value of 360 kohm,
g) the capacitor of the RC circuit having a value of 1.0 microfarads,
) the first, fourth, and fifth resistors of the bistable circuit each having a value of 100 kohm,
i) the second resistor of the bistable circuit having a value of 10 kohm, and
j) the third resistor of the bistable circuit having a value of 24 kohm,
whereby the specified component values provide operation when said power input is between 4.5 and 20 volts.

11. The switching circuit of claim 6, wherein said PNP and NPN transistors are contained within a single package, whereby said switching circuit may be made more compact.

12. The switching circuit of claim 6, wherein said bistable circuit contains means for altering the state of the circuit with an external input, whereby the controlled device may use this input to shut-off its own power.

13. The switching circuit of claim 12, wherein:
a) the shut-off means is provided by an additional NPN transistor,
b) the collector of said additional NPN transistor being connected to the base of the NPN transistor in the bistable circuit, and
c) the emitter of said additional NPN transistor being connected to ground,
whereby the base of said additional NPN transistor may be used as a shut-off input by a controlled device.

* * * * *